United States Patent
Li et al.

(10) Patent No.: US 12,063,100 B2
(45) Date of Patent: Aug. 13, 2024

(54) METHOD FOR SHARING RADIO SPECTRUM ON BASIS OF BEAM CONSTANT OFFSET, AND LOW-ORBIT COMMUNICATION SATELLITE SYSTEM

(71) Applicant: CHINA ACADEMY OF SPACE TECHNOLOGY, Beijing (CN)

(72) Inventors: Feng Li, Beijing (CN); Fenglong Hou, Beijing (CN); Yu Qi, Beijing (CN); Xiaoxiong Lin, Beijing (CN); Shengwei Pei, Beijing (CN); Dong Chen, Beijing (CN); Xingang Li, Beijing (CN); Zeyu Bao, Beijing (CN)

(73) Assignee: CHINA ACADEMY OF SPACE TECHNOLOGY, Beijing (CN)

( * ) Notice: Subject to any disclaimer, the term of this patent is extended or adjusted under 35 U.S.C. 154(b) by 400 days.

(21) Appl. No.: 17/626,737

(22) PCT Filed: Jun. 30, 2020

(86) PCT No.: PCT/CN2020/099137
§ 371 (c)(1),
(2) Date: Jan. 12, 2022

(87) PCT Pub. No.: WO2021/008349
PCT Pub. Date: Jan. 21, 2021

(65) Prior Publication Data
US 2022/0294525 A1    Sep. 15, 2022

(30) Foreign Application Priority Data
Jul. 12, 2019   (CN) .......................... 201910630504.4

(51) Int. Cl.
*H04B 7/185*    (2006.01)
*H04W 16/14*   (2009.01)

(52) U.S. Cl.
CPC ..... *H04B 7/18519* (2013.01); *H04B 7/18513* (2013.01); *H04W 16/14* (2013.01)

(58) Field of Classification Search
CPC .......................... H04W 16/14; H04B 7/18519; H04B 7/18513
See application file for complete search history.

(56) References Cited

U.S. PATENT DOCUMENTS

| | | | |
|---|---|---|---|
| 5,995,841 A | 11/1999 | King et al. | |
| 6,726,152 B2* | 4/2004 | Higgins | B64G 1/1007 244/158.4 |

(Continued)

FOREIGN PATENT DOCUMENTS

| | | |
|---|---|---|
| CN | 107210805 A | 9/2017 |
| CN | 108449150 A | 8/2018 |

(Continued)

OTHER PUBLICATIONS

International Search Report (in English and Chinese) and Written Opinion of the International Searching Authority (Chinese) issued in PCT/CN2020/099137, mailed Sep. 21, 2020; ISA/CN.

*Primary Examiner* — Justin Y Lee
(74) *Attorney, Agent, or Firm* — Harness, Dickey & Pierce, P.L.C.

(57) ABSTRACT

Provided are a method for sharing a radio spectrum with high-orbit communication satellites, which comprise a geosynchronous satellite and operate in a near-equatorial orbit, on the basis of a beam constant offset, and a low-orbit communication satellite system. The method comprises: low-orbit communication satellites completing, near the South and North Poles and the equator, the conversion of a transmitting beam constant offset state, wherein before and after each implementation, beam offset directions are the opposite of each other, and the beam offset degree is a fixed constant; the low-orbit communication satellites near the equator all deflect towards the equator; during beam offset (Continued)

conversion near the North and South Poles, services are provided by beams of other low-orbit communication satellites in two other orbits, which are adjacent to each other, at both sides of the current orbit; and during the implementation of beam offset conversion near an ascending node and a descending node, beam coverage services are provided by adjacent low-orbit communication satellites located at the other side of the ascending node or the descending node in the same orbit.

30 Claims, 10 Drawing Sheets

(56) References Cited

U.S. PATENT DOCUMENTS

| | | | |
|---|---|---|---|
| 2016/0149599 | A1 | 5/2016 | Lindsay et al. |
| 2020/0252881 | A1* | 8/2020 | Noel .................. H04B 7/18519 |

FOREIGN PATENT DOCUMENTS

| | | | |
|---|---|---|---|
| CN | 108882245 | A | 11/2018 |
| CN | 109743738 | A | 5/2019 |
| CN | 110417453 | A | 11/2019 |

* cited by examiner

METHOD FOR SHARING RADIO SPECTRUM ON BASIS OF BEAM CONSTANT OFFSET, AND LOW-ORBIT COMMUNICATION SATELLITE SYSTEM

The present application is a U.S. National Phase Application under 35 U.S.C. 371 of International Application No. PCT/CN2020/099137, filed on Jun. 30, 2020, which claims priority to Chinese Patent Application No. 201910630504.4, titled "METHOD FOR SHARING RADIO SPECTRUM ON BASIS OF BEAM CONSTANT OFFSET, AND LOW-ORBIT COMMUNICATION SATELLITE SYSTEM", filed on Jul. 12, 2019 with the Chinese Patent Office, both of which are incorporated herein by reference in their entirety.

FIELD

The present disclosure relates to a method for sharing radio spectrum based on a constant beam bias, and a low-orbit communication satellite system (that is, a method for sharing radio spectrum with a constant beam bias and a low-orbit communication satellite system), belonging to the technical field of earth orbit communication satellites.

BACKGROUND

Communication satellites are an important application of the space technology. The communication satellites receive radio signals from and transmit radio signals to the surface of the earth. With the development of the satellite communication technology and explosion of demand, radio spectrum becomes a very valuable commodity. Radio spectrum within a range may be auctioned for tens of billions of dollars.

Geosynchronous satellite is a typical communication satellite. The geosynchronous satellite orbits the earth in a plane intersecting the equator (that is, the equatorial plane) of the earth. The geosynchronous satellite is about 36000 kilometers (which is about six times the radius of the earth) away from the earth. The orbital period of the geosynchronous satellite is equal to one sidereal day. The geosynchronous satellite orbits the earth at a same angular velocity as the earth rotates around the axis of the earth, and thus the geosynchronous satellite is stationary to the observers on the earth.

Due to the huge distance between the geosynchronous (which is usually abbreviated as GEO) satellite and the surface of the earth, a wide region can be covered, requiring a high power for transmitting signals and resulting in a great communication delay. Further, for a single satellite, the capacity is limited and the cost is high. Thus, a satellite constellation system orbiting close to the surface of the earth may be more suitable for some applications, such as internet services. A low-orbit satellite constellation system has the advantages of large capacity and low delay. In addition, the cost of a single satellite may be reduced by batch production.

FIG. 1 shows that a low earth orbit (usually abbreviated as LEO) communication satellite system operating along a polar orbit. Beams, not being biased, of the communication satellite system seamlessly cover the earth, and the communication satellite system cannot share the radio spectrum with the GEO communication satellite. Generally, the LEO orbit is a satellite orbit less than or equal to about 2000 kilometers from the surface of the earth. As shown in FIG. 1, the height of the satellite orbit from the surface of the earth is smaller than the radius of the earth, and is about 1200 kilometers in the scale diagram. In FIG. 1, 1-110 represents the earth, 1-120 represents the North Pole, 1-130 represents the South Pole, 1-140 represents an LEO satellite, 1-150 represents an LEO polar orbit, 1-160 represents the equator, 1-170 represents a movement direction of satellites, and 1-180 represents an unbiased beam.

FIG. 2 shows the LEO satellite orbit near the equator as shown in FIG. 1 and the GEO satellite orbit. It is assumed that an orbital plane of the GEO satellite completely coincides with the equatorial plane. For the convenience of labeling text, the heights of the LEO satellite orbit and the GEO satellite orbit are not drawn strictly according to the scale in FIG. 2, and FIG. 2 only shows the schematic relationship between the LEO satellite orbit and the GEO satellite orbit. In FIG. 2, 2-110 represents the surface of the earth, 2-120 represents an LEO satellite orbit, 2-130 represents a GEO satellite orbit, 2-210 represents an LEO satellite, 2-220 represents a GEO satellite, 2-310 represents unbiased beams, 2-320 represents biased beams, 2-410 represents the radius $R_E$ of the earth, 2-420 represents a height $H_{LEO}$ of the LEO satellite orbit, 2-430 represents a height $H_{GEO}$ of the GEO satellite orbit, 2-510 represents a beam half cone angle $\varphi$, 2-520 represents a critical bias angle $\theta_1$, 2-530 represents a critical interference avoidance angle $\beta$, 2-540 represents an argument $\omega$ of a latitude of the LEO satellite, 2-610 represents a coverage region of the unbiased beams, 2-620 represents a coverage region of the biased beams, 2-710 represents a movement direction of the LEO satellite, 2-810 represents the orbital plane of the GEO satellite, coinciding with the equatorial plane, and 2-820 represents an ascending node of the LEO satellite orbit and the equatorial plane.

In FIG. 2, before the beam of the LEO satellite is biased, isolation angles between beams from the GEO satellite and beams from the LEO satellite received at a position on the surface of the earth within a region from point C to point A in the coverage region 2-610 is less than the critical interference avoidance angle $\beta$. In the region from point C to point A, the LEO satellite and the GEO satellite cannot share radio spectrum. After the beam of the LEO satellite is biased by $\theta_1$ towards the equator, isolation angles between beams from the GEO satellite and beams from the LEO satellite received at a position on the arc CD in the coverage region of the biased beams is greater than or equal to the critical interference avoidance angle $\beta$. In a case that the of the LEO satellite is biased by an angle greater than the critical bias angle $\theta_1$, the LEO satellite and the GEO satellite can share radio spectrum at any position in the coverage region of the biased beams. The critical bias angle $\theta_1$ is related to parameters such as the critical interference avoidance angle $\beta$, the argument $\omega$ of the latitude of the LEO satellite, the beam half cone angle $\varphi$, and the height $H_{LEO}$ of the LEO satellite orbit. In a case that other parameters are constant, the closer the LEO satellite in movement to the GEO satellite indicates that it is required to bias the beams of the LEO satellite by a larger critical bias angle $\theta_1$ to ensure that the LEO satellite and the GEO satellite can share radio spectrum.

Based on the analysis of FIG. 2, it can be seen that in a case that the LEO satellite shares radio spectrum with the GEO satellite, to avoid interference of the LEO satellite to the users of the GEO satellite in the region of arc AC, in addition to turning off part of beams of the LEO satellite, an effective way to alleviate the interference between the LEO satellite and the GEO satellite is to bias the beams of the LEO satellite by an angle.

FIG. 3 is a schematic diagram showing a minimum bias angle in a double coverage formed by two adjacent LEO satellites at two sides of an ascending node in a case of symmetrical biased beams. In FIG. 3, the argument of the latitude of each of the two LEO satellites is equal to half of a phase angle of the two adjacent LEO satellites, that is, ±½γ. For the convenience of labeling text, the heights of the LEO satellite orbit and the GEO satellite orbit are not drawn strictly according to the scale in FIG. 3, and FIG. 3 only shows the schematic relationship between the LEO satellite orbit and the GEO satellite orbit. In FIG. 3, 3-110 represents the surface of the earth, 3-120 represents an LEO satellite orbit, 3-130 represents a GEO satellite orbit, 3-210-1 represents an LEO satellite k, 3-210-2 represents an LEO satellite k−1, 3-220 represents a GEO satellite, 3-310-1 represents a biased beam of the LEO satellite k, 3-310-2 represents a biased beam of the LEO satellite k−1, 3-410 represents a phase angle γ of two adjacent LEO satellites, 3-420 represents a critical bias angle $\theta_2$ for forming a double coverage by beams of adjacent LEO satellites at two sides of the ascending node, 3-510 represents a double coverage region formed by the beams of the adjacent LEO satellites at two sides of the ascending node, 3-610 represents a orbital plane of the GEO satellite, assuming that the orbital plane of the GEO satellite coincides with the equatorial plane, 3-620 represents a movement direction of the LEO satellite, 3-630 represents an ascending node of the LEO satellite orbit and the equatorial plane, and 3-640 represents a centerline of beams.

In FIG. 3, near the ascending node, after the beams of the LEO satellite k and the beams of the LEO satellite k−1 are respectively biased by $\theta_2$ towards the equator, the coverage region of the beams of the LEO satellite k completely coincides with the coverage region of the beams of the LEO satellite k−1. The argument of latitude of the LEO satellite k is equal to ½γ, and the argument of latitude of the LEO satellite k−1 is equal to −½γ, where γ represents a phase angle of two adjacent LEO satellites. Only in the case of double coverage, it is may be ensured that even if an LEO satellite turns off beams completely, a seamless coverage region is still formed by LEO satellites adjacent to the LEO satellite.

FIG. 4 shows a solution for sharing radio spectrum between a low-orbit communication satellite system and a geosynchronous satellite according to the patent "COMMUNICATION-SATELLITE SYSTEM THAT CAUSES REDUCED INTERFERENCE (CN107210805A)". In the solution, the LEO polar orbit intersects the equatorial plane at an ascending node and a descending node. In FIG. 4, 4-110 represents the earth, 4-120 represents the North Pole, 4-130 represents the South Pole, 4-140 represents an LEO satellite, 4-150 represents a polar orbit of the LEO satellite, 4-160 represents the equator, where multiple GEO satellites obit over the equator, 4-170 represents a movement direction, 4-180 represents beams gradually biased towards the equator according to degrees to which the beams approach the equator, 4-210 represents an LEO satellite near the ascending node completely turning off beams, and 4-220 represents an LEO satellite near the descending node completely turning off beams. As the LEO satellite travels along the orbit, the beams of the LEO satellite are gradually biased. Thus, as the LEO satellite moves close to the equatorial plane, beams transmitted by the LEO satellite are gradually aimed towards the equatorial plane. At all satellite positions, there is always a good angular separation between the radio signals of the LEO satellite and the radio signals of the GEO satellite. The LEO satellites traveling along the orbit at even intervals provide a seamless coverage to the surface of the earth below the orbit. The LEO satellite turning off beams is closest to the equatorial plane. When passing through the equatorial plane, the LEO satellite turning off beams biases the beams to a direction symmetrical to the original direction along the equatorial plane. As the LEO satellite with turned-on beams travels along the orbit, the beams are gradually biased, and a coverage region of the LEO satellite is covered before the LEO satellite moves to a corresponding position on the orbit due to the biased beams. As the LEO satellite travels a half way along the orbit, that is, as the LEO satellite travels to the equatorial plane on the other side of the earth, the above process is repeated.

According to the core idea shown in FIG. 4, it is required for each of the satellites travelling in a same orbit to perform progressive beam bias around a pitch axis (which is perpendicular to the orbital plane) according to a rule in approaching the equator, and gradually resumes normal beam coverage on the earth in leaving the equator. It is ensured that each of satellites in gradually biasing beams in each of orbits maintains a seamless coverage on the earth by reserving a coverage region overlap margin, thereby ensuring a seamless coverage on the earth by the constellation.

For LEO satellites adopting the progressive beam bias method, a large coverage region margin of beams of a single LEO satellite is generally reserved for overlapping design of coverage regions of adjacent satellites. FIG. 5-1 shows typical pitch angle variation curves of an LEO satellite adopting the progressive beam bias method at different latitudes. In FIG. 5, a constant pitch angular velocity method is adopted in solution 1, and a variable pitch angular velocity method is adopted in solution 2. FIG. 5-2 shows rules of overlapping widths of coverage regions of adjacent LEO satellites in a same orbit obtained by using the solutions 1 and 2 shown in FIG. 5-1. Generally, a minimum width of an overlapped coverage region obtained based on the progressive beam bias method is equal to 40% to 60% of the width of the overlapped coverage region of the adjacent LEO satellites without biasing beams.

In designing the LEO satellite system, a minimum overlapping coverage region with uniform strength is optimal. According to the progressive beam bias method, it is required adjacent satellites in a same orbit to reserve a large beam coverage margin. Moreover, in the method, a high control accuracy is required in dynamically biasing beams, and there are high requirements for a beam bias device of the LEO satellite. The above problems are disadvantages of the patent "COMMUNICATION-SATELLITE SYSTEM THAT CAUSES REDUCED INTERFERENCE (CN107210805A)" based on the progressive beam bias method.

In addition, in a case that the progressive beam bias is performed by biasing an attitude, orbit correction in a tangential direction of the orbital plane can only be performed in a period in which progressive beam bias is not performed, thereby limiting the range of arcs for performing orbit correction.

SUMMARY

To solve the problems in the conventional technology, a method for sharing radio spectrum based on a constant beam bias and a low-orbit communication satellite system are provided according to the present disclosure. Compared with the progressive beam bias method in the patent "COMMUNICATION-SATELLITE SYSTEM THAT CAUSES REDUCED INTERFERENCE (CN107210805A)", with the constant beam bias method according to the present disclosure, a minimum overlapping coverage region by beams of equal intensities between adjacent low-orbit communication satellites can be achieved, without a high-precision device for controlling progressive beam bias. Based on the constant beam bias technology, the low-orbit communication satellite system sharing radio spectrum has significant advantages in design, manufacturing and operating costs.

The following technical solutions are provided according to the present disclosure. A method for sharing radio spectrum between a first communication satellite travelling in a low-orbit and a second communication satellite travelling in a near-equator orbit (that is, a method for sharing radio spectrum based on a constant beam bias technology) is provided according to the present disclosure (in the method, the low-orbit is less than or equal to about 2000 kilometers over a surface of the earth, a height of an orbit of an LEO satellite (that is, a low-orbit satellite) is not limited in the present disclosure, as long as the orbit of the LEO satellite is lower than an orbit of a high-orbit communication satellite which is travelling in the near-equatorial orbit and shares radio spectrum with the LEO satellite and meets predetermined requirements for an LEO satellite system). A first orbit where the first communication satellite is travelling is lower than a second orbit where the second communication satellite is travelling, the first orbit intersects the equatorial plane at an ascending node and a descending node, and the second orbit is the near-equatorial orbit. The method includes: (i) transmitting, by the first communication satellite, a radio signal to a surface of the earth to form a beam; and (ii) performing, by the first communication satellite, a constant beam bias conversion on the beam at a position near the ascending node, a position near the descending node, a position near an Arctic region, and a position near an Antarctic region.

A bias degree (that is a constant bias magnitude) of the beam is determined based on a minimum angle (that is, a minimum isolation angle) between the beam of the first communication satellite and a beam of the second communication satellite in a case that the first communication satellite and the second communication satellite share radio spectrum and the beam of the first communication satellite and the beam of the second communication satellite are spatially isolated from each other without interfering with each other, a size of the beam of the first communication satellite, a height of the orbit of the first communication satellite, a phase angle between two adjacent communication satellites in a same orbital plane, and an orbital inclination of the second communication satellite in the near-equatorial orbit. The beam bias degree is independent of a latitude of the first communication satellite. The beam bias degree is a constant.

For the ascending node, the beam of the first communication satellite near the equator is biased to the equator. For the descending node, the beam of the first communication satellite near the equator is biased to the equator.

The first communication satellite performs four constant beam bias conversions in one orbital cycle. The first communication satellite performs the constant beam bias conversion as the first communication satellite moves to the position near the ascending node, the position near the descending node, the position near the Arctic region, and the position near the Antarctic region in one orbital cycle. A bias direction of the beam is reversed and the bias degree of the beam remains unchanged after each of the constant beam bias conversions.

In the beam bias conversion, a current beam (that is, a beam on which a satellite performs the beam bias conversion) is turned off and stops providing services (that is, a power of the beam is reduced so as not to interfere with the second communication satellite).

In an embodiment, the beam is biased by biasing an attitude of the first communication satellite.

In an embodiment, a device for biasing an attitude of a satellite includes a reaction wheel (that is, a momentum wheel) or a control moment gyroscope.

In an embodiment, the attitude of the first communication satellite is biased by rotating the first communication satellite around a pitch axis of the first communication satellite.

In an embodiment, in performing the constant beam bias by rotating the first communication satellite around the pitch axis of the first communication satellite, an orbit control thruster layout in which an orbit control thruster pre-biases the first communication satellite in an opposite direction along the pitch axis is adopted, then a thrust along a tangential direction of the orbit and passing through a centroid of the first communication satellite is generated. With the orbit control thruster layout, orbit correction in the tangential direction of the orbit is performed in a constant attitude bias process.

In an embodiment, the constant attitude bias process is a process in which the attitude of the first communication satellite is biased based on a constant to perform the constant beam bias conversion.

In an embodiment, the beam is pre-biased in a direction along a pitch axis and then is rotated by 180 degrees around a yaw axis to reverse the bias direction of the beam.

In an embodiment, in pre-biasing the beam in the direction along the pitch axis, a projection of the beam on a sphere is optimized based on a curvature of the earth due to a stable bias state.

In an embodiment, the beam is biased by rotating one or more radio antennas of the first communication satellite.

In an embodiment, the beam is biased by performing electronic control.

In an embodiment, the beam is biased based on a phased array antenna technology.

In an embodiment, the position near the Arctic region is position in a double or above overlapping coverage region formed by a low-orbit communication satellite system in the Arctic region.

In an embodiment, the position near the Antarctic region is position in a double or above overlapping coverage region formed by a low-orbit communication satellite system in the Antarctic region.

In an embodiment, for the ascending node, the first communication satellite near the equator indicates that the first communication satellite does not perform the beam bias conversion at the position near the Arctic region after performing the beam bias conversion at the position near the Antarctic region; and for the descending node, the first communication satellite near the equator indicates that the first communication satellite does not perform the beam bias conversion at the position near the Antarctic region after performing the beam bias conversion at the position near the Arctic region.

In an embodiment, the position near the ascending node is a position in a region between a plus and a minus half the phase angle of the ascending node, and includes positions corresponding to the plus and the minus half the phase angle of the ascending node, where the phase angle is the phase angle between the two adjacent communication satellites in the same orbital plane.

In an embodiment, the position near the descending node is a position in a region between a plus and a minus half the phase angle of the descending node, and includes positions corresponding to the plus and the minus half the phase angle of the descending node, where the phase angle is the phase angle between the two adjacent communication satellites in the same orbital plane.

A communication satellite system is provided according to the present disclosure. The system includes multiple first communication satellites travelling in multiple first orbits. Multiple first communication satellites in each of the first orbits are distributed with a predetermined phase. Each of the first orbits intersects the equatorial plane at an ascending node and a descending node. Ascending nodes and descending nodes of the first orbits intersecting the equatorial plane are distributed at a predetermined interval, and parameters of the first orbits other than the ascending nodes and the descending nodes are the same. The first communication satellites share radio spectrum with a second communication satellite, including a geostationary satellite, travelling in a near-equator orbit. The second communication satellite travels in a second orbit. The second orbit is the near-equatorial orbit and is higher than the first orbits. The first communication satellites in the communication satellite system are configured to provide a seamless coverage with beams on a region of the earth or on the global earth, and on a space within a predetermined altitude corresponding to the region of the earth or the global earth, and provide a double and above overlapping coverage with the beams in the Antarctic region and the Arctic region. For each of the first communication satellites, the first communication satellite performs a constant beam bias conversion as the first communication satellite moves to a position near the ascending node, a position near the descending node, a position near the Arctic pole region, and a position near the Antarctic region in one orbital cycle, and a bias direction of a beam is reversed and a bias degree of the beam remains unchanged after the constant beam bias conversion. For each of the first communication satellites, the bias degree of the beam is determined based on a minimum angle between the beam of the first communication satellite and a beam of the second communication satellite in a case that the first communication satellite and the second communication satellite share radio spectrum and the beam of the first communication satellite and the beam of the second communication satellite are spatially isolated from each other without interfering with each other, a size of the beam of the first communication satellite, a height of the orbit of the first communication satellite, a phase angle between two adjacent communication satellites in a same orbital plane, and an orbital inclination of the second communication satellite in the near-equatorial orbit; the beam bias degree is independent of a latitude of the first communication satellite; and the beam bias degree is a constant. For each of the first communication satellites, for the ascending node, the beam of the first communication satellite near the equator is biased to the equator; and for the descending node, the beam of the first communication satellite near the equator is biased to the equator.

In an embodiment, for each of the current first communication satellites, the first communication satellite turns off the beam and stops providing services in performing the beam bias conversion at the position near the Arctic region and at the position near the Antarctic region, and other first communication satellites in two first orbits adjacent to a first orbit of the first communication satellite provide services with beams.

In an embodiment, at the position near the Arctic region and at the position near the Antarctic region, first communication satellites in two adjacent first orbits respectively perform beam bias conversion when reaching or leaving a position in a double overlapping coverage region, to acquire a maximum conversion processing time interval between adjacent first communication satellites in different orbits.

In an embodiment, for each of the first communication satellites, the first communication satellite turns off the beam and stops providing services in performing the beam bias conversion at the position near the ascending node, and a satellite adjacent to the first communication satellite, on another side of the ascending node and in a same first orbit as the first communication satellite, provides a coverage service with beams; and the first communication satellite turns off the beam and stops providing services in performing the beam bias conversion at the position near the descending node, and a satellite adjacent to the first communication satellite, on another side of the descending node and in a same first orbit as the first communication satellite, provides a coverage service with beams.

In an embodiment, for each of the first communication satellites, before the first communication satellite at the position near the ascending node or at the position near the descending node turns off beams, coverage by beams of the first communication satellite and coverage by beams of an adjacent first communication satellite at another side of the ascending node or the descending node form a double overlapping coverage on a service region of the earth, where the bias direction of the beams of the adjacent first communication satellite is opposite to the bias direction of the beams of the first communication satellite.

In an embodiment, for each of the first communication satellites, at the position near the ascending node or at the position near the descending node, at most one first communication satellite turns off beams and stops providing services at a time instant, and all adjacent first communication satellites turn on beams.

In an embodiment, regions covered by beams of adjacent first communication satellites in a same orbital plane are evenly overlapped in the constant beam bias conversion, to achieve a seamless beam coverage with a least beam coverage margin.

In an embodiment, it is supported that all the first communication satellites turn off or turn on beams.

In an embodiment, for each of the first communication satellites, an angular velocity of beams of the first communication satellite relative to the earth is the same as an angular velocity of the first communication satellite relative to the earth.

In an embodiment, for each of the first communication satellites, the first communication satellite includes an orbit control thruster, and a reaction wheel or a control moment gyroscope, the orbit control thruster is configured to generate a thrust for performing orbit control, and the reaction wheel or the control moment gyroscope are configured to provide a torque to control an attitude of a satellite.

In an embodiment, each of the first communication satellites further includes one or more radio antennas to transmit and receive beams.

In an embodiment, each of the first communication satellites transmits a radio signal to a surface of the earth to form a beam.

In an embodiment, a beam is turned off and stops providing services in the beam bias conversion, and the beam is turned on and provides service after the beam bias conversion.

In an embodiment, that the multiple first communication satellites in each of the first orbits are distributed with a predetermined phase indicates the first communication satellites in each of the first orbits are distributed at equal intervals.

Compared with the conventional technology, the present disclosure has the following advantages.

(1) With the constant beam bias method according to the present disclosure, the LEO satellite maintains a constant beam bias in moving along the orbit, an optimal design of a uniform overlapping coverage region between adjacent LEO satellites is supported, thereby significantly reducing the coverage margin of a single satellite. It is only required to perform the constant beam bias conversion at a position near the ascending node, a position near the descending node, a position near the Arctic region, and a position near the Antarctic region. The control accuracy of the beam bias conversion is not limited, and the requirements for the control accuracy of the beam bias device are low. In the beam bias conversion, the entire beams may be turned off. The angular velocity of the beams relative to the earth is the same as the angular velocity of the LEO satellite relative to the earth.

(2) In an embodiment, in performing the constant beam bias by rotating the LEO satellite around the pitch axis of the satellite, an orbit control thruster layout in which an orbit control thruster pre-biases the first communication satellite in an opposite direction along the pitch axis is adopted, then a thrust along a tangential direction of the orbit and passing through a centroid of the satellite is generated. With the orbit control thruster layout, orbit correction in the tangential direction of the orbit is performed in a constant attitude bias process. In performing beam progressive bias by progressively biasing the pitch attitude, the orbit correction along the tangential direction of the orbit cannot be realized by the LEO satellite in progressively biasing the attitude around the pitch axis, thereby limiting an ignition arc in correcting the orbit of the LEO satellite.

(2) In the present disclosure, the beam is pre-biased in a direction along a pitch axis and then is rotated by 180 degrees around a yaw axis to reverse the bias direction of the beam. Thus, the projection of the beam on a sphere can be optimized based on the curvature of the earth. In addition, the orbit control thruster can be deployed normally, without limiting an ignition arc in correcting the orbit of the LEO satellite.

The beam is biased by performing electronic control, and thus the difficulty and cost of the beam bias conversion can be reduced due to that there are only two beam bias states.

BRIEF DESCRIPTION OF THE DRAWINGS

FIG. 5-1 is a schematic diagram showing typical pitch angle variation curves of an LEO satellite at different latitude arguments in progressive beam bias according to the conventional technology;

FIG. 5-2 is a schematic diagram showing a typical variation curve of a margin of a seamless coverage region with a latitude argument in a progressive beam bias according to the conventional technology;

DETAILED DESCRIPTION

Figure 1:
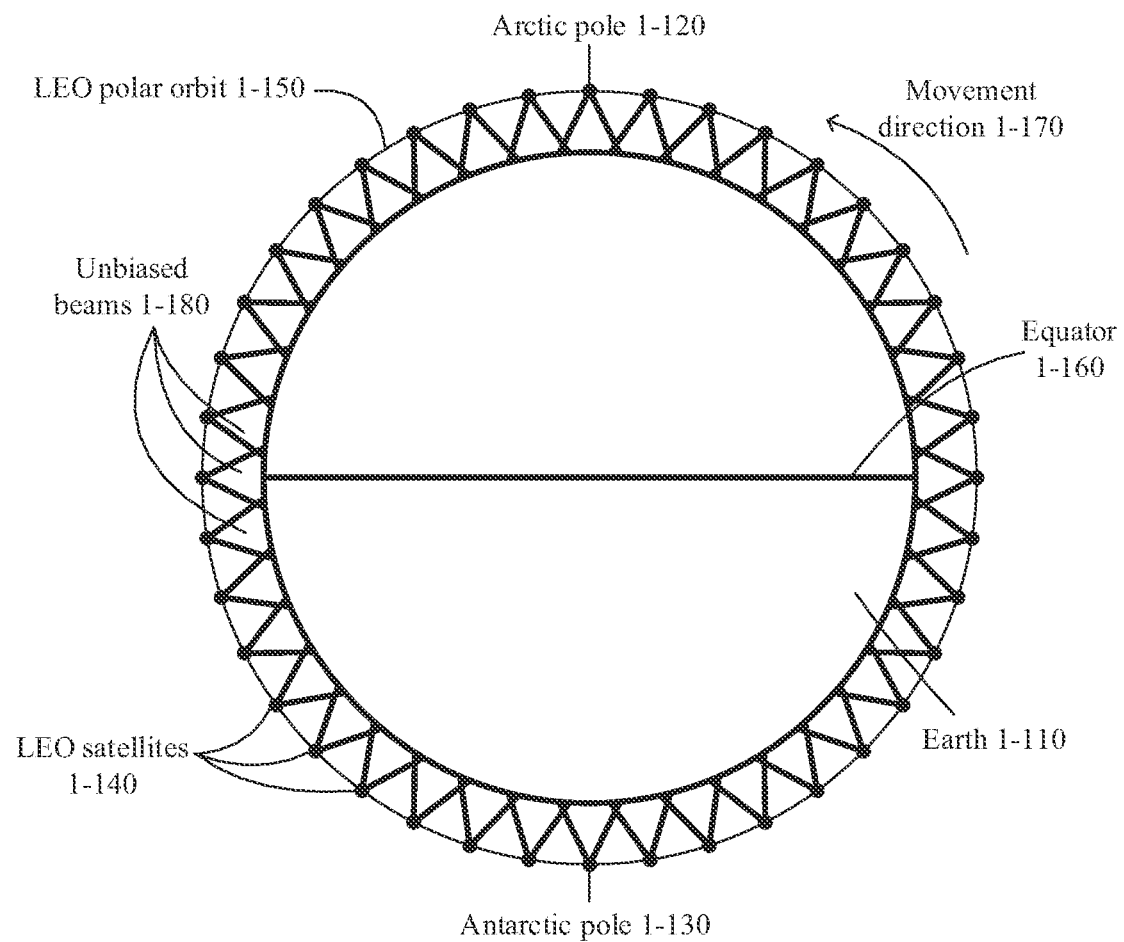
FIG. 1 is a schematic diagram of an LEO satellite system according to the conventional technology. Beams, not being biased, of the LEO satellite system seamlessly cover the earth, and the LEO satellite system cannot share the radio spectrum with the GEO communication satellite.

The present disclosure is described in detail in conjunction with drawings and embodiments hereinafter.

A method for sharing radio spectrum with a high-orbit communication satellite travelling in a near-equatorial orbit, including a geosynchronous satellite, based on a constant beam bias, and a low-orbit communication satellite system are provided according to the present disclosure. The method includes the following processing. The low-orbit communication satellite performs a constant beam bias conversion on the beam transmitted by the low-orbit communication satellite at a position near the Arctic region, at a position near the Antarctic region, and a position near the equator. After performing the constant beam bias conversion every time, a bias direction of the beam is reversed. A beam bias degree is a constant. The beam of the low-orbit communication satellites travelling near the equator is biased to the equator. In performing the beam bias conversion at the position near the Arctic region and at the position near the Antarctic region, low-orbit communication satellites in two adjacent orbits at two sides of the orbit of the current low-orbit communication satellite provide services with beams. In performing the beam bias conversion at the position near the ascending node or at the position near the descending node, a low-orbit communication satellite adjacent to the current low-orbit communication satellite, on another side of the ascending node or the descending node and in a same first orbit as the current low-orbit communication satellite, provides a coverage service with beams.

The low-orbit communication satellite system according to the present disclosure includes multiple LEO satellites.

The LEO satellites orbit the earth in multiple orbits with a large inclination angle relative to the equatorial plane. In each of the orbits, multiple LEO satellites travel at equal phase intervals. For each of the orbits, an ascending node and a descending node of the equatorial plane are distributed at predetermined intervals. Parameters of the first orbits other than the ascending nodes and the descending nodes are the same. The low-orbit communication satellite system provides a seamless coverage on a surface of the earth below an orbit and on a space within a predetermined altitude corresponding to the surface of the earth. For the low-orbit satellite system for providing global coverage, it is required to adopt near-polar orbit with a large inclination. In this way, the low-orbit communication satellite system provides coverages on the Arctic region and the Antarctic region, and thus double and above overlapping coverages are formed on the Arctic region and the Antarctic region.

According to the present disclosure, the low-orbit communication satellite system shares radio spectrum with the high-orbit communication satellite travelling in the near-equatorial orbit including the geosynchronous satellite, thereby saving extremely expensive radio spectrum resources. Compared with the progressive beam bias method, beam coverages of the LEO satellites in the low-orbit satellite system can be determined based on a minimum overlapping coverage region according to the constant beam bias method in the present disclosure. In addition, compared with the progressive beam bias method, requirements for accuracy of a beam bias device can be reduced with the constant beam bias method according to the present disclosure. Therefore, with the constant beam bias method according to the present disclosure, the low-orbit communication satellite system sharing radio spectrum has significant advantages in design, manufacturing and operating costs.

According to an embodiment of the present disclosure, an LEO satellite travels along a circular polar orbit. The polar orbit of the LEO satellite intersects the equatorial plane at an ascending node and a descending node. For the ascending node, a beam of a first communication satellite travelling near the equator is biased towards the equator. For the descending node, the beam of the first communication satellite travelling near the equator is biased towards the equator. The LEO satellite performs a constant beam bias conversion respectively at a position near the ascending node, at a position near the descending node, at a position near the Arctic region and at a position near the Antarctic region. After each of the above constant beam bias conversions, the beam bias degree remains unchanged and a bias direction of the beam is reversed.

As shown in FIGS. 6 to 10, the LEO satellite maintains a constant beam bias. It is required for an LEO satellite passing through the equator to turn off beams to avoid interferences of the radio spectrums between the LEO satellite and the GEO satellite. Since good angular separations between radio signals of LEO satellites other than the LEO satellite passing through the equator and radio signals of the GEO satellite are kept due to that beams of LEO satellites and beams of the GEO satellite are biased sufficiently, it is unnecessary for the other LEO satellites to turn off beams.

If only considering a single orbit, beams on both sides of the equator are symmetrical based on the constant beam bias method, therefore forming cracks in coverage regions in the Arctic region and the Antarctic region due to the opposite beam bias directions. However, the low-orbit satellite system for providing global coverage travels in multiple adjacent orbits having large inclination angles with the equatorial plane, thereby forming double and above overlapping coverages on the Arctic region and the Antarctic region. Bases on the above feature, the problem of the cracks in coverage regions in the Arctic region and the Antarctic region due to the symmetry beams on both sides of the equator based on the constant beam bias method can be solved.

In a case that the beam bias conversion is performed after entering a double overlapping coverage region in the Arctic region or the Antarctic region, each of LEO satellites in odd and even orbits performs beam bias conversion when reaching or leaving a position in the double overlapping coverage region, thereby achieving a maximum conversion processing time interval between adjacent LEO satellites in different orbits. In this way, it is ensured to a greatest extent that when an LEO satellite in a current orbit performs beam bias conversion, LEO satellites in two orbits adjacent to the current orbit do not perform beam bias conversion and provide a seamless beam coverage service, thereby ensuring that the LEO satellite system provides a seamless coverage in the Arctic region and the Antarctic region at any time. For example, an LEO satellite in an odd orbit performs beam bias conversion after entering the seamless double overlapping coverage region in the Arctic region or in the Antarctic region, and an LEO satellite in an even orbit performs beam bias conversion before leaving the seamless double overlapping coverage region in the Arctic region or in the Antarctic region.

In performing beam bias conversion near the ascending node or the descending node, a current LEO satellite turns off beams and stops providing services, and an adjacent LEO satellite on another side of the ascending node or the descending node in a same orbit provides a beam coverage service. Near the ascending node or the descending node, only one satellite turns off beams at a time instant, and beams of all the other adjacent satellites are maintained a turned-on state at the time instant. Before the current LEO satellite turns off beams, coverage by beams of the current LEO satellite and coverage by beams of an adjacent LEO satellite at another side of the ascending node or the descending node form a double overlapping coverage on a service region of the earth, where the bias direction of the beams of the adjacent LEO satellite is opposite to the bias direction of the beams of the current LEO satellite.

For the beam bias conversion near the ascending node or the descending node, it is required to perform operations, such as beam turning off, beam bias conversion, and beam turning on, in a phase interval period of an adjacent LEO satellite. In this way, it is ensured that when the current LEO satellite turns off beams and stops providing services, an adjacent LEO satellite has turned on beams and provided services, thereby ensure a seamless beam coverage by the low-orbit satellite system travelling near the ascending node or the descending node.

For the beam bias conversion near the Arctic region or the Antarctic region, it is unnecessary to perform operations, such as beam turning off, beam bias conversion, and beam turning on, in a phase interval period of an adjacent LEO satellite. However, a longer phase interval period in which operations are performed indicates that a larger coverage region crack is to be generated in a single orbit, and the requirements for positions and time instants at which beam bias conversion are performed by LEO satellites in different orbits are more stringent.

Generally, a beam bias conversion period may be determined based on hardware configuration of an LEO satellite.

In FIGS. 6 to 10, the periods for turning on beams, beam bias conversion and turning off beams are determined as minimum requirements at the ascending node or at the descending node, that is, determined as phase interval periods of adjacent LEO satellites.

In a case of performing the constant beam bias by biasing an attitude of the pitch axis, an orbit control thruster layout in which an orbit control thruster pre-biases the LEO satellite in an opposite direction along the pitch axis is adopted. In this layout, a thrust along a tangential direction of the orbit and passing through a centroid of the LEO satellite may be generated, orbit correction in the tangential direction of the orbit is performed in a constant attitude bias process on both sides of the equator, and the range of restricted orbit correction ignition arc is small.

In a case that the beam bias conversion is performed by rotating an LEO satellite 180 degrees around a yaw axis (pointing to the center of the earth) of the LEO satellite, the beam may be pre-biased in a direction of the pitch axis. In this case, a projection of the beam on a sphere may be optimized based on a curvature of the earth. In addition, the orbit control thruster may be arranged in a normal layout, and the range of the arc section of the orbit correction ignition is not to be limited.

In a case that the beam bias conversion is performed by performing electronic control, the difficulty and cost of the beam bias conversion may be reduced due to that there are only two beam bias states.

Figure 6:
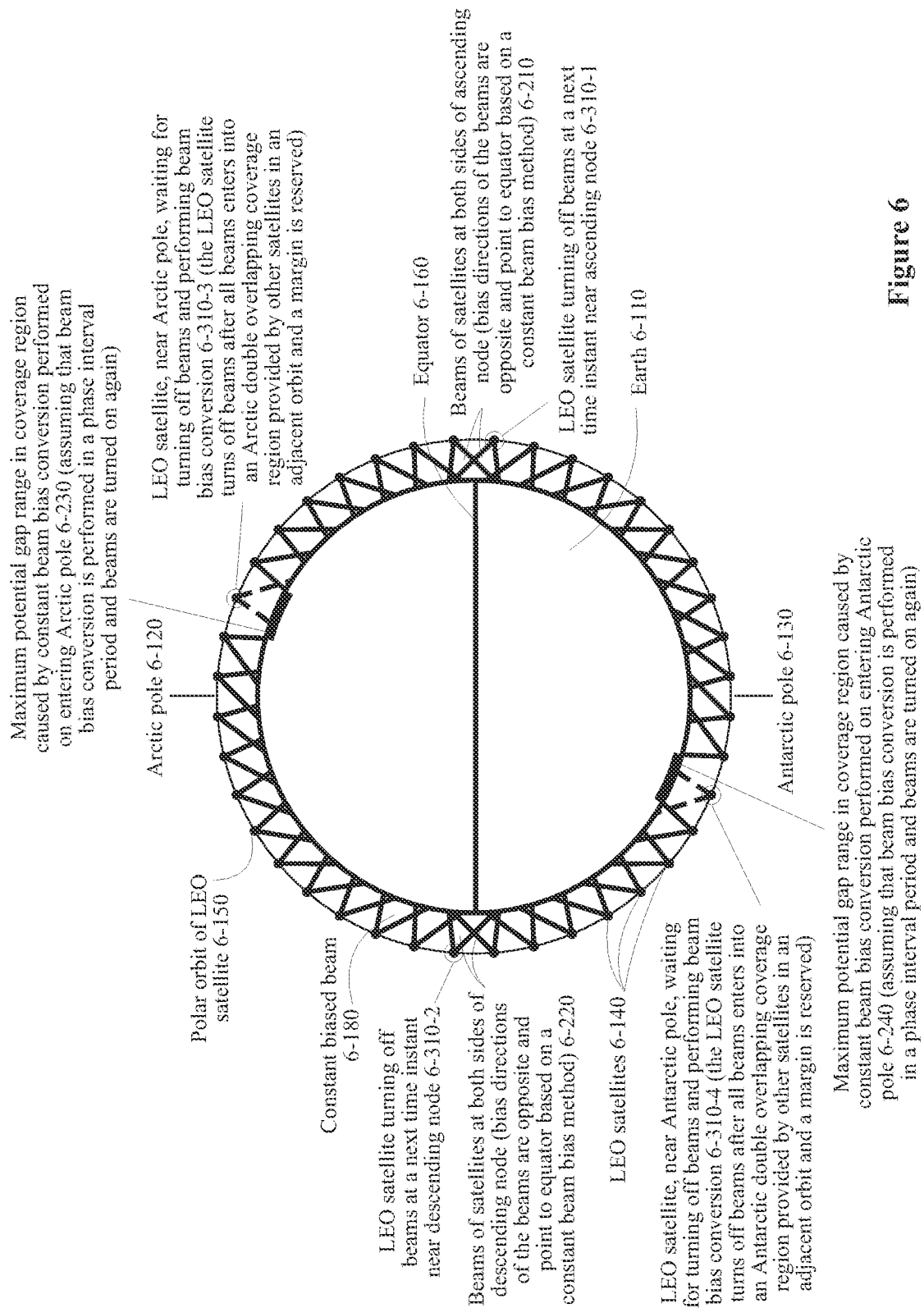
FIG. 6 shows an LEO communication satellite system sharing radio spectrum with a GEO satellite based on a constant beam bias method when LEO satellites are moving at both sides of an ascending node and a descending node.

FIG. 6 shows an LEO communication satellite system sharing radio spectrum with a GEO satellite based on a constant beam bias method when LEO satellites are moving at both sides of an ascending node and a descending node. In FIG. 6, 6-110 represents the earth, 6-120 represents the Arctic pole, 6-130 represents the Antarctic pole, 6-140 represents an LEO satellite, 6-150 represents a polar orbit of the LEO satellite, 6-160 represents the equator, 6-170 represents a movement direction, 6-180 represents constant biased beams, 6-210 represents beams of satellites respectively travelling on a side of the ascending node based on the constant beam bias solution, where the beams have opposite bias directions and point to the equator, 6-220 represents satellite beams on both sides of the descending node based on the constant beam bias solution, where the beams have opposite bias directions and point to the equator, 6-230 represents a maximum potential gap range in a coverage region caused by the constant beam bias conversion performed by an LEO satellite on entering the Arctic pole (assuming that the beam bias conversion is performed within a phase interval period and the beams are turned on again), 6-240 represents a maximum potential gap range in a coverage region caused by the constant beam bias conversion performed by an LEO satellite on entering the Antarctic pole (assuming that the beam bias conversion is performed in a phase interval period and the beams are turned on again), 6-310-1 represents an LEO satellite turning off beams at a next time instant near the ascending node, where a latitude argument of the current LEO satellite is $-\frac{1}{2}\gamma$ and $\gamma$ represents a phase angle of two adjacent LEO satellites, 6-310-2 represents an LEO satellite turning off beams at a next time instant near the descending node, where a latitude argument of the current LEO satellite is $-\frac{1}{2}\gamma+180$ degrees, 6-310-3 represents an LEO satellite waiting for turning off beams to perform beam bias conversion near the Arctic pole (the LEO satellite turns off beams after the beams enters an Arctic pole double overlapping coverage region provided by other satellites in an adjacent orbit and a margin is reserved), 6-310-4 represents an LEO satellite waiting for turning off beams to perform beam bias conversion near the Antarctic Pole (the LEO satellite turns off beams after the beams enters an Antarctic pole double overlapping coverage region provided by other satellites in an adjacent orbit and a margin is reserved).

It is required for the bias angles of satellites on a side of the ascending node or on a side of the descending node to meet the following two conditions simultaneously. In one condition, it is required that the bias angles are greater than a critical bias angle $\theta_1$, so that beam isolation angles between the beams received from the GEO satellite and the beams received from the LEO satellite at any position are greater than or equal to a critical interference avoidance angle $\beta$. In the other condition, it is required that the bias angles are greater than a critical bias angle $\theta_2$ corresponding to a double overlapping coverage formed by adjacent LEO satellites on both sides of the ascending node or the descending node. The bias angle is equal to the maximum of the critical bias angles $\theta_1$ and $\theta_2$. For the definitions of the critical bias angles $\theta_1$ and $\theta_2$, one may refer to FIGS. 2 and 3.

Figure 3:
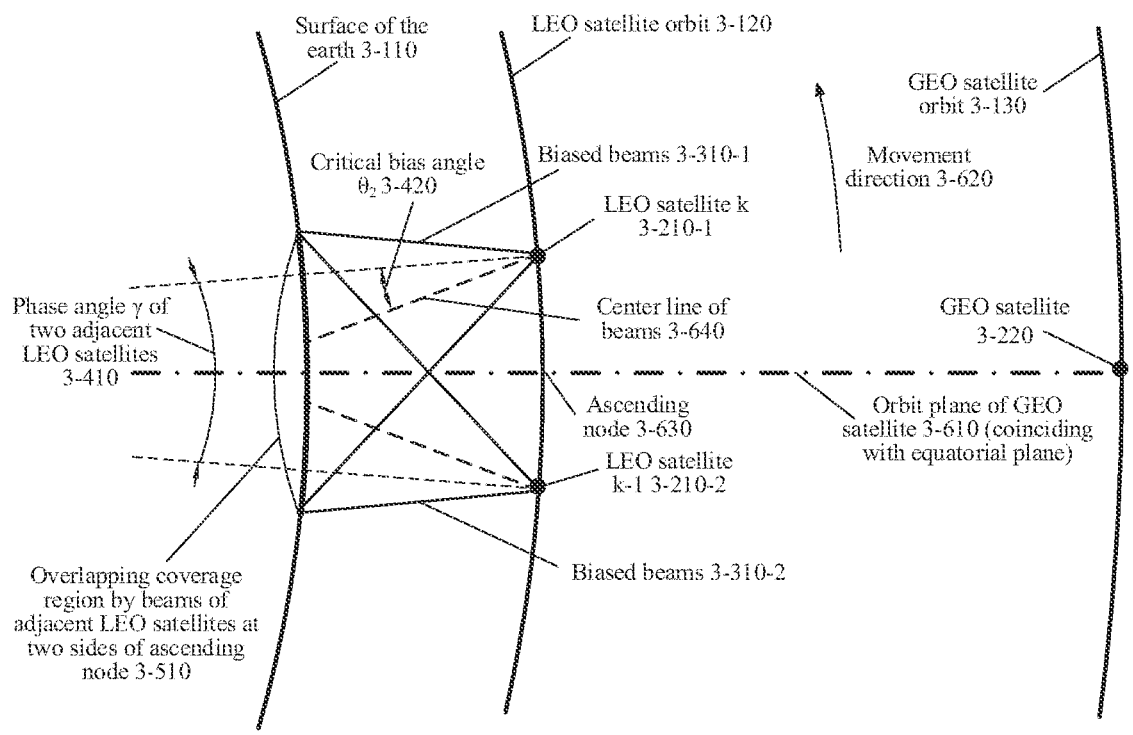
FIG. 3 is a schematic diagram showing a minimum bias angle of two adjacent LEO satellites at two sides of an ascending node for forming double overlapping coverage in a case of symmetrical beam bias according to the conventional technology.
Figure 4:
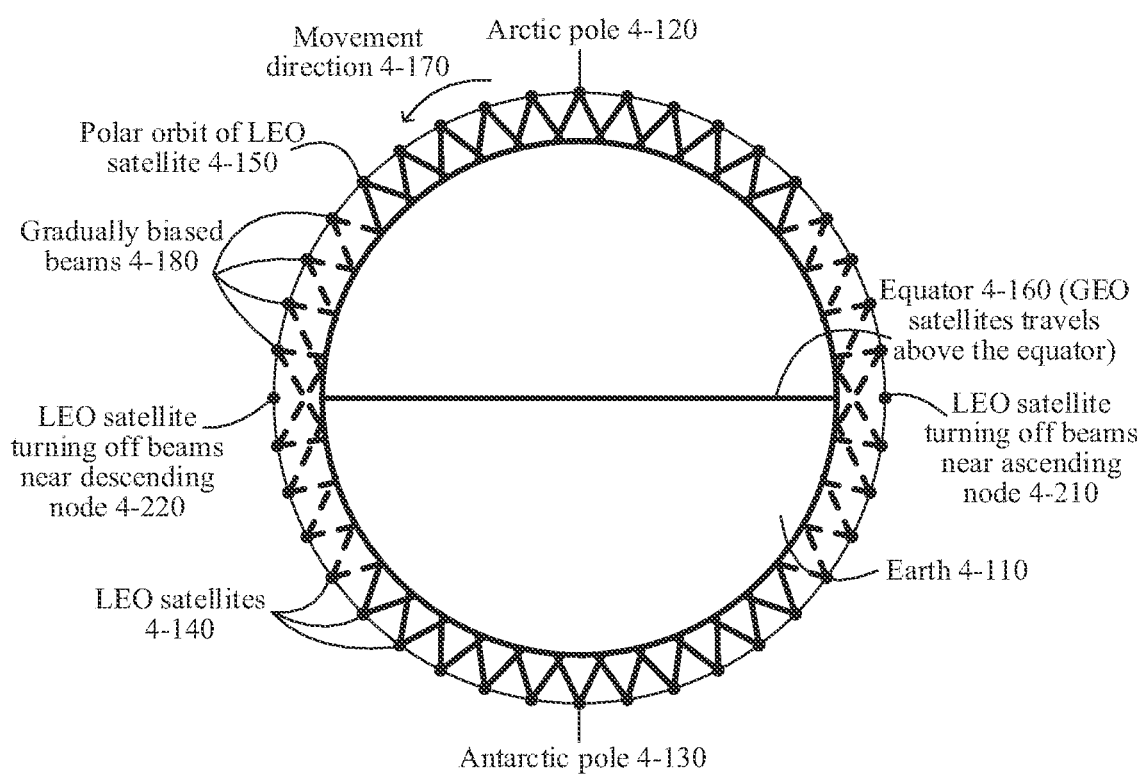
FIG. 4 is a schematic diagram of an LEO satellite system sharing radio spectrum with a communication satellite near the equator based on a progressive beam bias method according to the conventional technology.
Figures 1, 5:
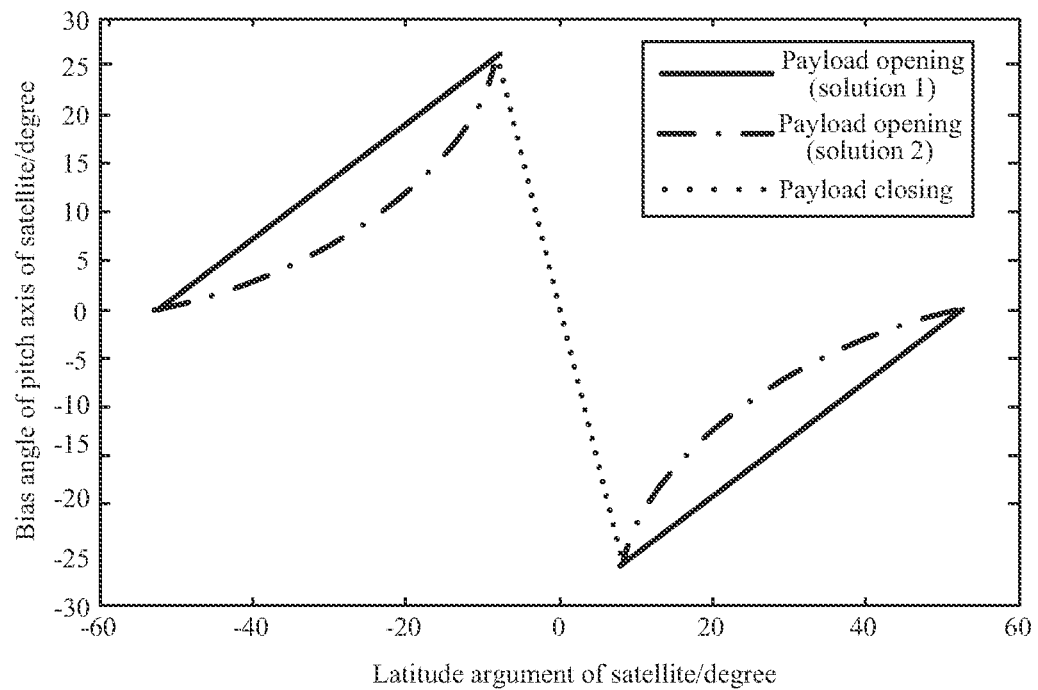
Figures 2, 5:
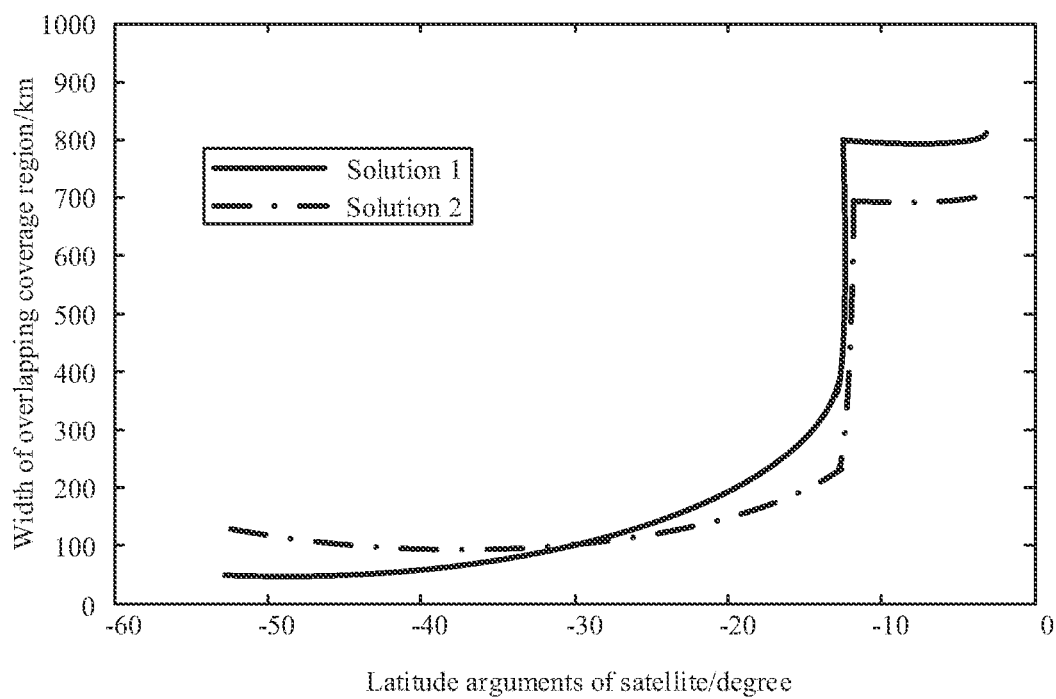

In order to ensure that a minimum beam isolation angle between an LEO satellite with the argument $\omega$ (which is equal to a half of the phase angle $\gamma$ of adjacent LEO satellites in a same orbit in the present disclosure and is shown in FIG. 3) of a latitude and the beam half cone angle $\varphi$ and a GEO satellite with an orbital inclination of 0 degree (that is, the orbital plane coincides with the equatorial plane) is greater than the critical interference avoidance angle $\beta$, the critical bias angle $\theta_1$ is calculated by the following equations:

$$\theta_1 = \begin{cases} 0, \text{ if } \alpha \geq \beta + \varphi \\ \beta + \varphi - \alpha, \text{ if } \alpha < \beta + \varphi \end{cases}$$

$$\begin{cases} \alpha = \omega + \eta \\ \eta = \arctan\left(\dfrac{(R_E + H_{LEO}) \sin \omega}{R_E + H_{GEO} - (R_E + H_{LEO}) \cos \omega}\right) \end{cases}$$

Figure 2:
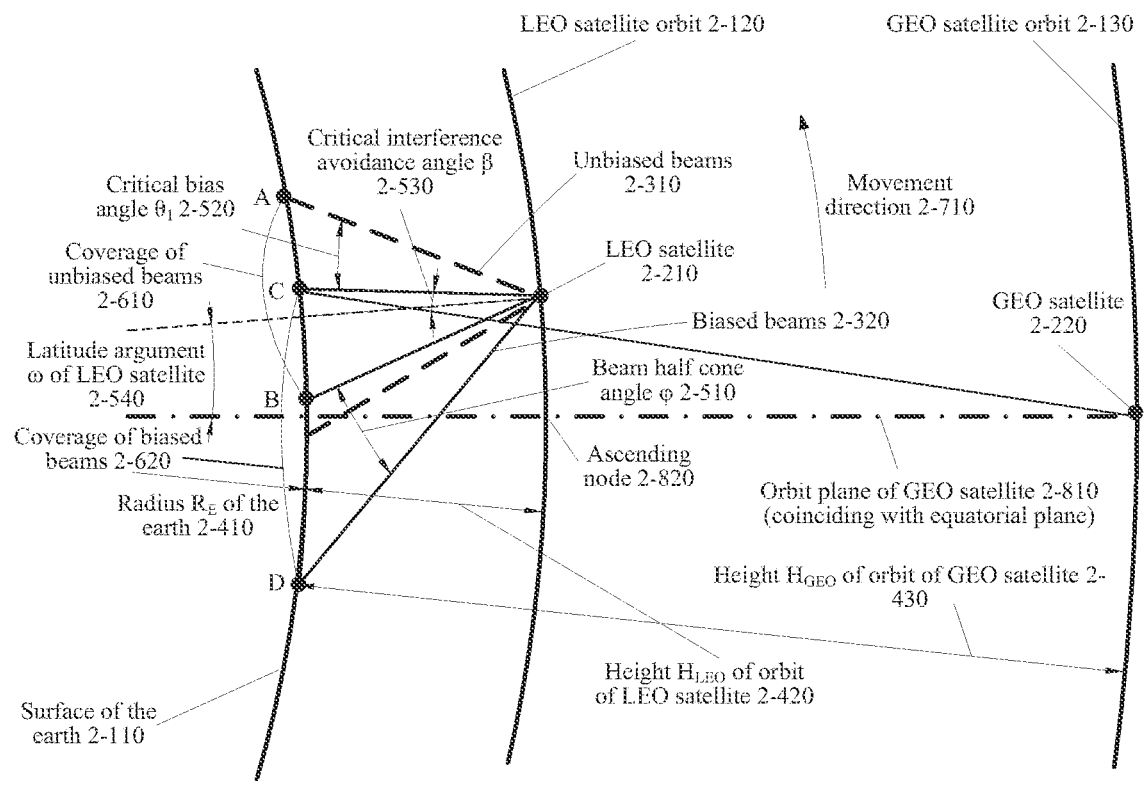
FIG. 2 is a schematic diagram showing minimum bias angles of beams of an LEO satellite at different latitudes for sharing radio spectrum with a GEO communication satellite according to the conventional technology.

In the above equations, the radius $R_E$ of the earth, the height $H_{LEO}$ of the orbit of the LEO satellite, the height $H_{GEO}$ of the orbit of the GEO satellite, the beam half cone angle $\beta$, the critical bias angle $\theta_1$, the critical interference avoidance angle $\varphi$ and the latitude argument $\omega$ of the LEO satellite are shown in FIG. 2; $\omega$ is equal to $\frac{1}{2}\gamma$, where $\gamma$ represents a phase angle of two adjacent LEO satellites and is shown in FIG. 3; $\alpha$ and $\eta$ represent angle variables. The above equations represent an analytic method after engineering simplification. Since the GEO satellites is high enough relative to the LEO orbits, the accuracy of a result obtained by the simplified calculation is enough for engineering. The critical bias angle may further be solved by numerical iteration.

In a case that an LEO satellite to share radio spectrum with a near-equator GEO satellite having a small inclination angle $\Delta i$ (where $\Delta i$ is not greater than $\frac{1}{2}\gamma$, and $\gamma$ represents a phase angle of two adjacent LEO satellites), a relatively larger bias angle is required to avoid radio frequency interference. In this case, the critical interference avoidance angle $\beta$ corresponding to the GEO satellite with the orbital inclination of 0 degree sharing the radio spectrum is achieved by the critical bias angle $\theta_1$ at a position with a latitude argument $\omega$ being equal to $\frac{1}{2}\gamma-\Delta i$.

The critical bias angle $\theta_2$ may be solved by using a numerical iteration algorithm based on predetermined geometric parameters, which is shown in FIG. 3.

It should be noted that the above calculation is to obtain a minimum critical bias angle required for the latitude argument, being equal to ±½γ, of the LEO satellite. In a case that the LEO satellite simultaneously shares radio spectrum with multiple GEO satellites travelling at different positions and having different inclination angles, a maximum among critical bias angles corresponding to multiple GEO satellites is determined as the minimum critical bias angle of the LEO satellite.

FIG. 6 shows a scenario in which the latitudes of adjacent LEO satellites on both sides of the ascending node and the descending node are equal to a half of phase angles of the adjacent LEO satellites. In the scenario, beams of the LEO satellites on both sides of the ascending node and the descending node are turned on to form a good double overlapping coverage near the ascending node and the descending node. At a next time instant, beams of the LEO satellite 6-310-1 immediately behind the ascending node are to be turned off, and beams of the LEO satellite 6-310-2 immediately behind the descending node are to be turned off.

FIG. 6 further shows a process of generating a gap in a coverage region near the Arctic pole due to performing the beam bias conversion. The bias direction of beams of the LEO satellite 6-310-3 is opposite to the bias direction of beams of an adjacent satellite in front of the LEO satellite. Beams of the LEO satellite are turned on at a current time instant. When beams of the LEO satellite move forward until LEO satellites in other adjacent orbits provide a double overlapping coverage region and a margin is reserved, the beams are turned off. In addition, beam bias conversion is performed to adjust the bias direction of the beams to the other side, and the beam bias degree remains unchanged. Assuming that the LEO satellite 6-310-3 performs beam bias conversion and turns on the beams again in a phase interval period of adjacent LEO satellites, the maximum potential gap range generated by the LEO satellite in a current orbit is shown in 6-230. A process of beam bias conversion of the LEO satellite 6-310-4 near the Antarctic Pole is similar to the process of beam bias conversion of the LEO satellite 6-310-3.

Figure 7:
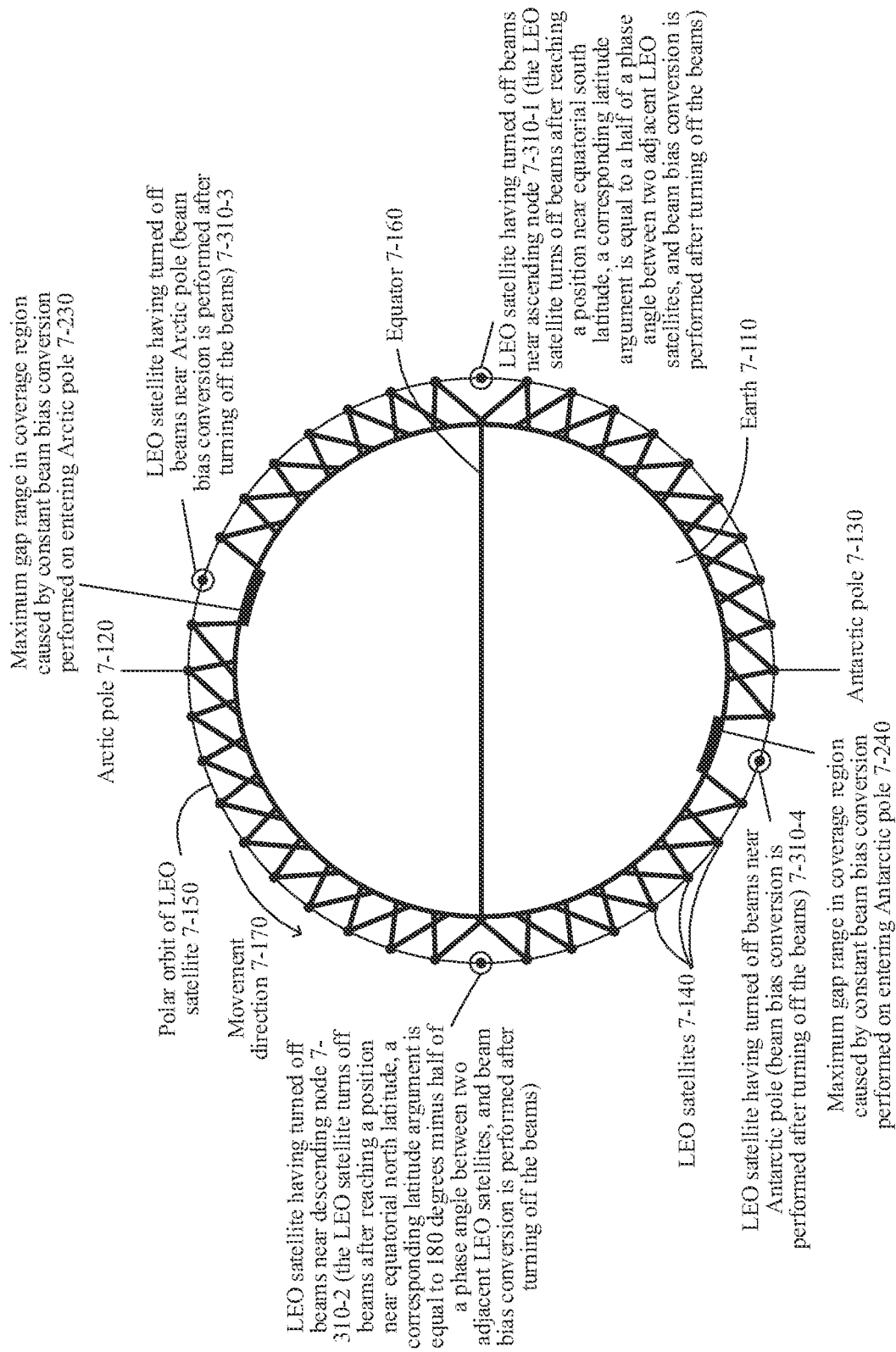
FIG. 7 shows an LEO communication satellite system sharing radio spectrum with a GEO satellite based on a constant beam bias method when LEO satellites in a same orbit are passing through an ascending node and a descending node.

FIG. 7 shows a beam coverage after the LEO satellite moves forward by a half of the phase angle of the adjacent satellites based on FIG. 6, that is, shows a scenario in which the LEO satellite in the current orbit passes through the ascending node and the descending node. In FIG. 7, 7-110 represents the earth, 7-120 represents the Arctic Pole, 7-130 represents the Antarctic pole, 7-140 represents an LEO satellite, 7-150 represents a polar orbit of the LEO, 7-160 represents the equator, 7-170 represents a movement direction of the LEO satellite, 7-230 represents a maximum gap range in a coverage region caused by the constant beam bias conversion performed by an LEO satellite on entering the Arctic pole, 7-240 represents a maximum gap range in a coverage region caused by the constant beam bias conversion performed by an LEO satellite on entering the Antarctic pole, 7-310-1 represents an LEO satellite turning off beams near the ascending node (the LEO satellite turns off the beams on entering a position near the equatorial south latitude, the latitude argument is equal to −½γ, γ represents a phase angle of two adjacent LEO satellites, and beam bias conversion is performed after the beams are turned off), 7-310-2 represents an LEO satellite turning off beams near the descending node (the LEO satellite turns off the beams on entering a position near the equatorial north latitude, the latitude argument is equal to −½γ+180 degrees, γ represents a phase angle of two adjacent LEO satellites, and beam bias conversion is performed after the beams are turned off), 7-310-3 represents an LEO satellite having turned off beams near the Arctic pole (beam bias conversion is performed after the beams are turned off), and 7-310-4 represents an LEO satellite having turned off beams near the Antarctic pole (beam bias conversion is performed after the beams are turned off).

FIGS. 6 and 7 show beam bias, time instants at which beam bias conversion is performed, and time instants at which beams are turned off of LEO satellites in a same orbit. A larger one of the critical bias angle $\theta_1$ and the critical bias angle $\theta_2$ is determined as a bias angle of beams of the LEO satellite, ensuring a seamless coverage by the LEO satellites near the equator, and ensuring that a beam isolation angle between beams received from the GEO satellite and beams received from the LEO satellite at any position near the equator is greater than or equal to the critical interference avoidance angle β.

Figure 8:
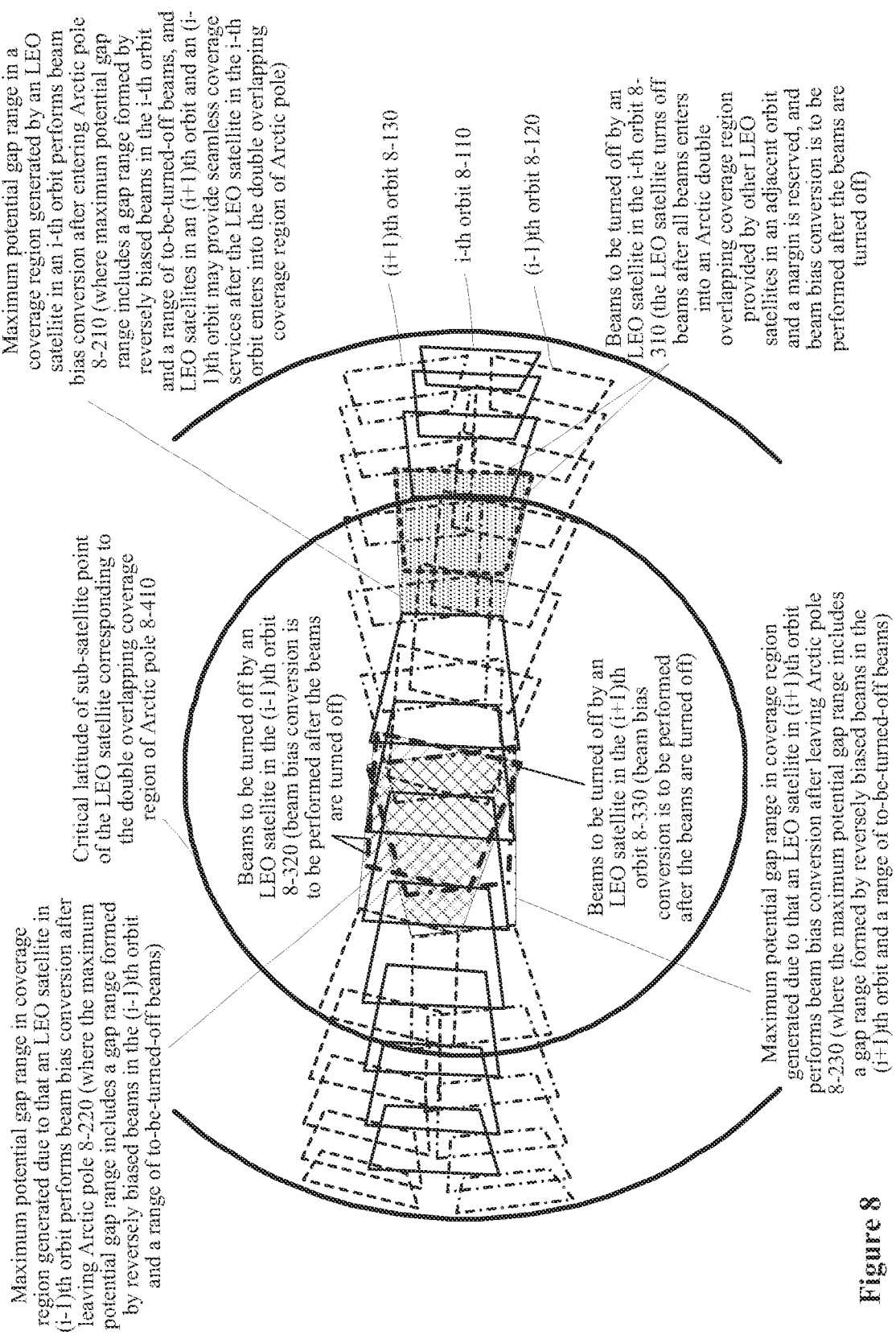
FIG. 8 shows an LEO communication satellite system sharing radio spectrum with a GEO satellite based on a constant beam bias method in a case that LEO satellites in multiple adjacent orbits perform beam bias conversion in entering into a double overlapping coverage region of the Arctic region and leaving the double overlapping coverage region of the Arctic region.

FIG. 8 shows a scenario in which LEO satellites in multiple adjacent orbits perform beam bias conversion on entering a double overlapping coverage region of the Arctic pole or leaving the double overlapping coverage region of the Arctic pole. In the scenario, a largest gap in the coverage region caused by beam bias conversion performed by an LEO satellite in an i-th orbit on entering a region near the Arctic pole may be covered by beams of other LEO satellites in adjacent (i−1)th and (i+1)th orbits. In FIG. 8, 8-110 represents the i-th orbit; 8-120 represents the (i−1)th orbit, 8-130 represents the (i+1)th orbit; 8-210 represents a maximum potential gap range in a coverage region generated by an LEO satellite in an i-th orbit performs beam bias conversion after entering Arctic pole, where the maximum potential gap range includes a gap range formed by reversely biased beams in the i-th orbit and a range of to-be-turned-off beams, and LEO satellites in an (i+1)th orbit and an (i−1)th orbit may provide seamless coverage services after the LEO satellite in the i-th orbit enters into the double overlapping coverage region of Arctic pole; 8-220 represents a maximum potential gap range in a coverage area generated when the LEO satellite in the i−1-th orbit leaving the Arctic pole performs beam bias conversion, where the maximum potential gap is formed by reverse bias beams in the i−1-th orbit and to-be turned-off beams, 8-230 represents a maximum potential gap range in a coverage area generated due to that an LEO satellite in (i+1)th orbit performs beam bias conversion after leaving Arctic pole, where the maximum potential gap range includes a gap range formed by reversely biased beams in the (i+1)th orbit and a range of to-be-turned-off beams; 8-310 represents beams to be turned off by an LEO satellite in the i-th orbit, the LEO satellite turns off beams after all beams enters into an Arctic double overlapping coverage region provided by other LEO satellites in an adjacent orbit and a margin is reserved, and beam bias conversion is to be performed after the beams are turned off; 8-320 represents beams to be turned off by an LEO satellite in the (i−1)th orbit 8-320; 8-330 represents beams to be turned off by an LEO satellite in the (i+1)th orbit; and 8-410 represents a critical latitude of sub-satellite point of the LEO satellite corresponding to the double overlapping coverage region of Arctic pole. For the beams 8-320 and 8-330, beam bias conversion is performed after the beams 8-320 and 8-330 are turned off. The latest time instant for performing the beam bias conversion is a time instant at which a trailing edge of beams of an adjacent LEO satellite in a same orbit is within the double overlapping coverage region of the Arctic pole and a margin is reserved after performing the current beam bias conversion and turning on the beams. In the above process, LEO satellites in odd and even orbits respectively perform beam bias conversion on reaching or leaving a position in the double overlapping coverage region to achieve a maximum conversion processing time interval. With the method according to the present disclosure, it can be ensured to a greatest extent that in a process of an LEO satellite in an i-th orbit performing beam bias conversion and stopping a beam coverage service on entering a double overlapping coverage region of the Arctic pole, LEO satellites in adjacent (i−1) and (i+1)th orbits can provide beam coverage services. The beam bias conversion performed near the Antarctic pole is similar to the beam bias conversion performed near the Arctic pole, and the same method can be used.

Figure 9:
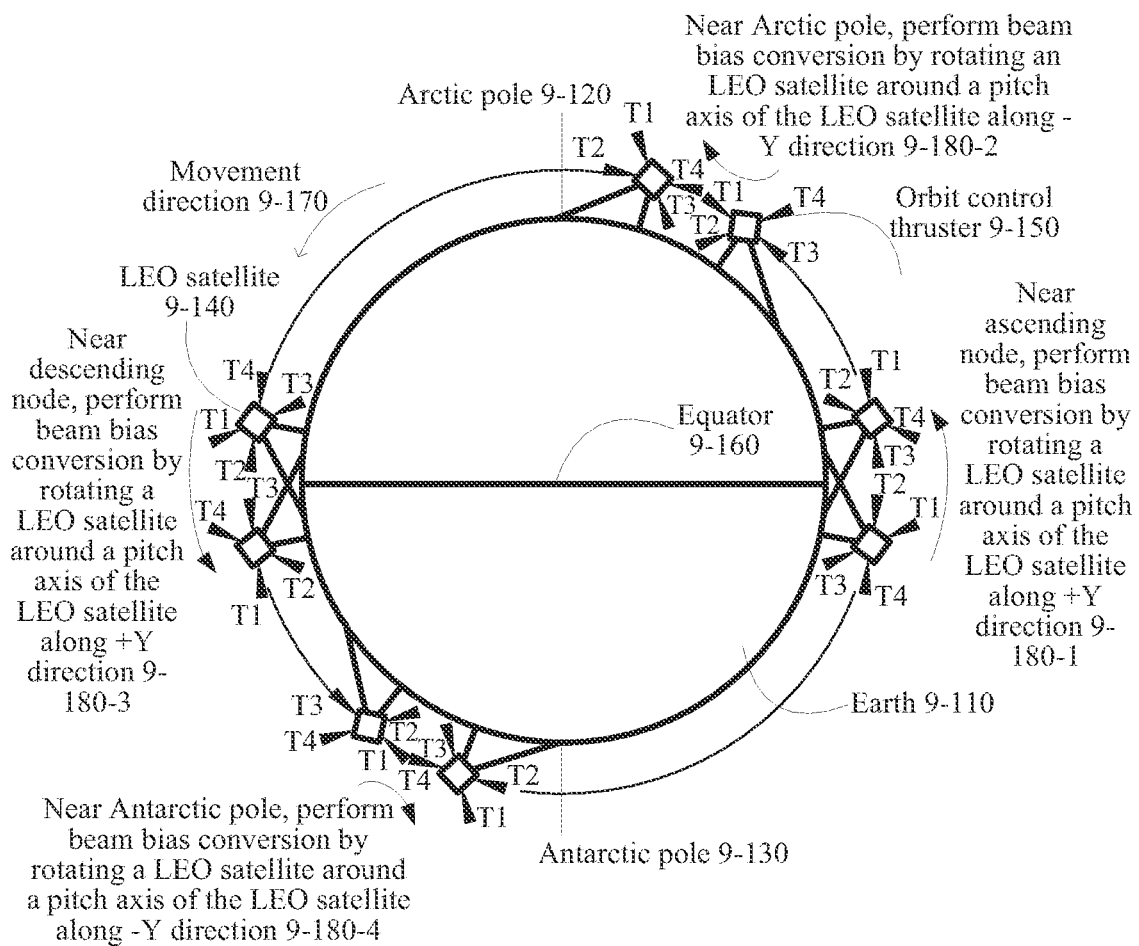
FIG. 9 is a schematic diagram showing a layout of an orbit control thruster in a case that a constant beam bias method is performed by biasing an attitude of a pitch axis of an LEO satellite.

FIG. 9 is a schematic diagram of a layout of an orbit control thruster in a case that constant beam bias is performed by biasing an attitude of a pitch axis of an LEO satellite. In FIG. 9, 9-110 represents the earth, 9-120 represents the Arctic pole, 9-130 represents the Antarctic pole, 9-140 represents an LEO satellite, 9-150 represents an orbit control thruster, 9-160 represents the equator, 9-170 represents a satellite movement direction, 9-180-1 represents performing beam bias conversion by rotating an LEO satellite around a pitch axis of the LEO satellite along +Y direction near the ascending node, 9-180-2 represents performing beam bias conversion by rotating a an LEO satellite round a pitch axis of the LEO satellite along −Y direction near the Arctic pole, 9-180-3 represents performing beam bias conversion by rotating an LEO satellite around a pitch axis of the LEO satellite along +Y direction near the descending node, and 9-180-4 represents performing beam bias conversion by rotating an LEO satellite around a pitch axis of the LEO satellite along −Y direction near the Antarctic pole. In FIG. 9, an orbit control thruster layout in which an orbit control thruster pre-biases an LEO satellite in an opposite direction along the pitch axis is adopted, then a thrust along a tangential direction of the orbit and passing through a centroid of the LEO satellite is generated. With the orbit control thruster layout, orbit correction in the tangential direction of the orbit is performed in a constant attitude bias process. T1, T2, T3, and T4 show locations where the orbit control thruster may be deployed.

Figure 10:
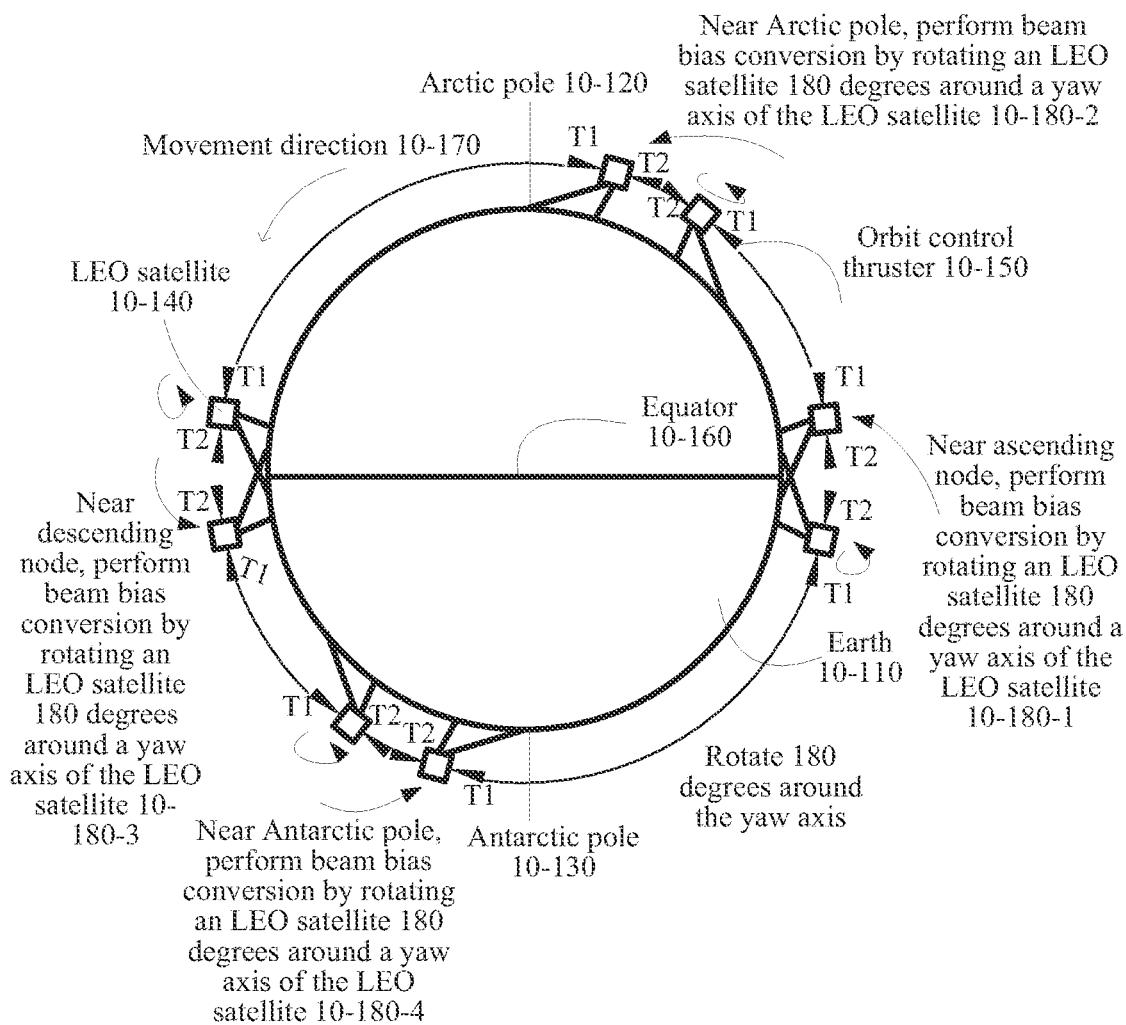
FIG. 10 is a schematic diagram showing a solution for performing beam bias conversion by rotating an LEO satellite around a yaw axis (pointing to the center of the earth) by 180 degrees.

FIG. 10 is a schematic diagram showing a solution for performing beam bias conversion by rotating an LEO satellite 180 degrees around a yaw axis (pointing to the center of the earth). In FIG. 10, a beam pre-biased layout method is used, and orbit correction in the tangential direction of the orbit is performed with constant beam bias. In FIG. 10, 10-110 represents the earth, 10-120 represents the Arctic pole, 10-130 represents the Antarctic pole, 10-140 represents an LEO satellite, 10-150 represents an orbit control thruster, 10-160 represents the equator, 10-170 represents a satellite movement direction, 10-180-1 represents performing beam bias conversion by rotating an LEO satellite 180 degrees around a yaw axis of the LEO satellite near the ascending node, 10-180-2 represents performing beam bias conversion by rotating an LEO satellite 180 degrees around a yaw axis of the LEO satellite near the Arctic pole, 10-180-3 represents performing beam bias conversion by rotating an LEO satellite 180 degrees around a yaw axis of the LEO satellite near the descending node, and 10-180-4 represents performing beam bias conversion by rotating an LEO satellite 180 degrees around a yaw axis of the LEO satellite near the Antarctic pole. The orbit control thruster may be arranged normally. T1 and T2 show locations where the orbit control thruster may be deployed. In this case, a projection of the beam on a sphere is optimized based on a curvature of the earth due to a stable bias state.

It can be seen from FIGS. 6 to 10 that the beams are in a constant beam bias state in providing services, and angular velocities of the beams of the LEO satellite relative to the earth is the same as an angular velocity of the LEO satellite relative to the earth.

The polar orbit of the LEO satellite and the equatorial orbit of the GEO satellite are described in the embodiments of the present disclosure. After reading the contents of the present disclosure, those skilled in the art know how to implement and use the embodiments of the present disclosure. For example, other LEO satellite systems with a large inclination share radio spectrum with a satellite with an orbital inclination in a near-equatorial high orbit. Generally, it is required that the inclination angle $\Delta i$ of the satellites in the high orbit is less than $\frac{1}{2}\gamma$, and $\gamma$ represents a phase angle of two adjacent LEO satellites. In addition, an orbit of a high-orbit satellite is higher than that an orbit of a low-orbit satellite.

In order to intuitively illustrate the cost advantages of the constant beam bias method, descriptions are provided in detail by taking a low-orbit satellite system as an example.

It is assumed that basic parameters of the low-orbit satellite system are as follows. The height of the orbit is 1200 kilometers, the orbital inclination is 87.9 degrees, and the number of orbits is eighteen. In each of the orbits, LEO satellites are distributed at equal intervals, and the number of the LEO satellites is fifty. In a case that the beams are not biased, a beam coverage region of each of the LEO satellites has a half width angle of ±22 degrees from north to south and ±26.5 degrees from east to west (the beam coverage region is 986 kilometers in the north-south direction and 1228 kilometers in the east-west direction). Coverage regions of adjacent LEO satellites overlaps 163 kilometers in the north-south direction without biasing beams. When a sub-satellite point of the LEO satellite enters into a region between the north and south latitudes of 63 degrees, the LEO satellite system may provide a double or above overlapping coverage in the Arctic region and the Antarctic region.

Based on the progressive beam bias method, the critical interference avoidance angle $\beta$ is equal to 7 degrees, so that the LEO satellite may share radio spectrum with a GEO satellite with an orbital inclination of 0 degree. A starting position of progressive bias is selected from a region between 55 degrees south latitude and 55 degrees north latitude. For the ascending node, in a case that a latitude argument of the LEO satellite is equal to −3.6 degrees, it is required a maximum bias angle of 25 degrees and the bias direction is an equatorial direction; and in a case that the latitude argument of the LEO satellite is equal to 3.6 degrees, it is required a maximum bias angle of 25 degrees and the bias direction is the equatorial direction. For the descending node, in a case that the latitude argument of the LEO satellite is 176.4 degrees, it is required a maximum bias angle of 25 degrees and the bias direction is the equatorial direction; and in a case that the latitude argument of the LEO satellite is 183.6 degrees, it is required a maximum bias angle of 25 degrees, and the bias direction is the equatorial direction. By optimizing the progressive beam bias method, a width of the minimum beam overlapping coverage region in the north-south direction between adjacent LEO satellites is 88 kilometers.

In a case that the constant beam bias method according the present disclosure is adopted, for same constellation configuration parameters, a half width angle of the beam coverage area of a single LEO satellite is required to be between 18 degrees from north to south, and 26.5 degrees from east to west. In this case, a constant beam bias angle is 21 degrees. For the ascending node, in a case that a latitude argument is ±3.6 degrees, a beam bias angle is equal to 21 degrees, so that the minimum beam isolation angle between the LEO satellite and the GEO satellite can be greater than 7 degrees. With the constant beam bias method, the width of the beam overlapping coverage region between adjacent LEO satellites in the north-south direction is 159 kilometers, which is better than width of the minimum beam overlapping coverage region in the north-south direction according to the progressive beam bias method. For the odd orbit, the beam bias conversion is performed when the sub-satellite point of the LEO satellite reaches 65 degrees north latitude. For the even orbit, the beam bias conversion is performed when the sub-satellite point of the LEO satellite leaves 65 degrees north latitude. All the beam bias conversion is completed within a phase interval period of adjacent LEO satellites. The beam bias conversion performed near the descending node and the Antarctic pole is similar to the beam bias conversion performed near the ascending node and the Arctic pole.

According to the progressive beam bias method, in a case that the bias angle is 25 degrees and the half width angle of the beam coverage region is between 22 degrees north latitude and 22 degrees south latitude, the width of the beam coverage region is 1421 kilometers. According to the constant beam bias method, in a case that the bias angle is 21 degrees and the half width angle of the beam coverage region is between 18 degrees north latitude and 18 degrees south latitude, the width of the beam coverage region is 982 kilometers.

A ratio of the width of the beam coverage region according to constant beam bias method to the width of the beam coverage region according to the progressive beam bias method is 82%. In a case of the maximum bias, a ratio of the coverage region according to the constant beam bias method to the coverage region according to the progressive beam bias method is 69%.

The bias angle according to the constant beam bias method is less than the bias angle according to the progressive beam bias method, and thus path loss according to the constant beam bias method is less than path loss according to the progressive beam bias method.

Further, assuming that flux density according to the constant beam bias method is equal to flux density according to the progressive beam bias method, in a case of the maximum bias, a payload power of the LEO satellite according to the constant beam bias method is only 69 percent of a payload power of the LEO satellite according to progressive beam bias method.

It can be seen from comparison of the above basic parameters that the development cost of the LEO satellite according to the constant beam bias method can be greatly reduced.

The invention claimed is:

1. A method for sharing radio spectrum between a first communication satellite travelling in a low orbit and a second communication satellite travelling in a near-equator orbit, wherein a first orbit where the first communication satellite is travelling is lower than a second orbit where the second communication satellite is travelling, the first orbit intersects the equatorial plane at an ascending node and a descending node, and the second orbit is the near-equator orbit, wherein the method comprises:

(i) transmitting, by the first communication satellite, a radio signal to a surface of the earth to form a beam; and (ii) performing, by the first communication satellite, a constant beam bias conversion on the beam at a position near the ascending node, a position near the descending node, a position near an Arctic region, and a position near an Antarctic region, wherein a bias degree of the beam is determined based on a minimum angle between the beam of the first communication satellite and a beam of the second communication satellite in a case that the first communication satellite and the second communication satellite share radio spectrum and the beam of the first communication satellite and the beam of the second communication satellite are spatially isolated from each other without interfering with each other, a size of the beam of the first communication satellite, a height of the orbit of the first communication satellite, a phase angle between two adjacent communication satellites in a same orbital plane, and an orbital inclination of the second communication satellite in the near-equatorial orbit; the beam bias degree is independent of a latitude of the first communication satellite; and the beam bias degree is a constant;

for the ascending node, the beam of the first communication satellite travelling near the equator is biased to the equator; and for the descending node, the beam of the first communication satellite travelling near the equator is biased to the equator;

the first communication satellite performs four constant beam bias conversions in one orbital cycle, wherein the first communication satellite performs the constant beam bias conversion as the first communication satellite moves to the position near the ascending node, the position near the descending node, the position near the Arctic region, and the position near the Antarctic region in one orbital cycle, and a bias direction of the beam is reversed and the bias degree of the beam remains unchanged after each of the constant beam bias conversions; and in the beam bias conversion, a current beam is turned off and stops providing services.

2. The method according to claim 1, wherein the beam is biased by biasing an attitude of the first communication satellite.

3. The method according to claim 2, wherein a device for biasing an attitude of a satellite comprises a reaction wheel or a control moment gyroscope.

4. The method according to claim 2, wherein the attitude of the first communication satellite is biased by rotating the first communication satellite around a pitch axis of the first communication satellite.

5. The method according to claim 4, wherein in performing the constant beam bias by biasing the pitch axis of the first communication satellite, an orbit control thruster layout in which an orbit control thruster pre-biases the first communication satellite in an opposite direction along the pitch axis is adopted, then a thrust along a tangential direction of the orbit and passing through a centroid of the first communication satellite is generated; and with the orbit control thruster layout, orbit correction in the tangential direction of the orbit is performed in a constant attitude bias process.

6. The method according to claim 5, wherein the constant attitude bias process is a process in which the attitude of the first communication satellite is biased based on a constant to perform the constant beam bias conversion.

7. The method according to claim 2, wherein the beam is pre-biased in a direction along a pitch axis and then is rotated by 180 degrees around a yaw axis to reverse the bias direction of the beam.

8. The method according to claim 7, wherein in pre-biasing the beam in the direction along the pitch axis, a projection of the beam on a sphere is optimized based on a curvature of the earth due to a stable bias state.

9. The method according to claim 1, wherein the beam is biased by rotating one or more radio antennas of the first communication satellite.

10. The method according to claim 1, wherein the beam is biased by performing electronic control.

11. The method according to claim 10, wherein the beam is biased based on a phased array antenna technology.

12. The method according to claim 1, wherein the position near the Arctic region is position in a double or above overlapping coverage region formed by a low-orbit communication satellite system in the Arctic region.

13. The method according to claim 1, wherein the position near the Antarctic region is position in a double or above overlapping coverage region formed by a low-orbit communication satellite system in the Antarctic region.

14. The method according to claim 1, wherein
for the ascending node, the first communication satellite near the equator indicates that the first communication satellite does not perform the beam bias conversion at the position near the Arctic region after performing the beam bias conversion at the position near the Antarctic region; and
for the descending node, the first communication satellite near the equator indicates that the first communication satellite does not perform the beam bias conversion at the position near the Antarctic region after performing the beam bias conversion at the position near the Arctic region.

15. The method according to claim 1, wherein
the position near the ascending node is a position in a region between a plus and a minus half the phase angle of the ascending node, and comprises positions corresponding to the plus and the minus half the phase angle of the ascending node, wherein the phase angle is the phase angle between the two adjacent communication satellites in the same orbital plane.

16. The method according to claim 1, wherein
the position near the descending node is a position in a region between a plus and a minus half the phase angle of the descending node, and comprises positions corresponding to the plus and the minus half the phase angle of the descending node, where the phase angle is the phase angle between the two adjacent communication satellites in the same orbital plane.

17. A communication satellite system, comprising a plurality of first communication satellites travelling in a plurality of first orbits, wherein
a plurality of first communication satellites in each of the first orbits are distributed with a predetermined phase;
each of the first orbits intersects the equatorial plane at an ascending node and a descending node;
ascending nodes and descending nodes of the first orbits intersecting the equatorial plane are distributed at predetermined intervals, and parameters of the first orbits other than the ascending nodes and the descending nodes are the same;
the first communication satellites share radio spectrum with a second communication satellite, comprising a geostationary satellite, travelling in a near-equator orbit;
the second communication satellite travels in a second orbit;
the second orbit is the near-equatorial orbit and is higher than the first orbits;
the first communication satellites in the communication satellite system are configured to provide a seamless coverage with beams on a region of the earth or on the global earth, and on a space within a predetermined altitude corresponding to the region of the earth or the global earth, and provide a double and above overlapping coverage with the beams in the Antarctic region and the Arctic region;
for each of the first communication satellites, the first communication satellite performs a constant beam bias conversion as the first communication satellite moves to a position near the ascending node, a position near the descending node, a position near the Arctic pole region, and a position near the Antarctic region in one orbital cycle, and a bias direction of a beam is reversed and a bias degree of the beam remains unchanged after the constant beam bias conversion;
for each of the first communication satellites,
the bias degree of the beam is determined based on a minimum angle between the beam of the first communication satellite and a beam of the second communication satellite in a case that the first communication satellite and the second communication satellite share a frequency and the beam of the first communication satellite and the beam of the second communication satellite are spatially isolated from each other without interfering with each other, a size of the beam of the first communication satellite, a height of the orbit of the first communication satellite, a phase angle between two adjacent communication satellites in a same orbital plane, and an orbital inclination of the second communication satellite in the near-equatorial orbit; the beam bias degree is independent of a latitude of the first communication satellite; and the beam bias degree is a constant; and
for each of the first communication satellites,
for the ascending node, the beam of the first communication satellite near the equator is biased to the equator; and for the descending node, the beam of the first communication satellite near the equator is biased to the equator.

18. The system according to claim 17, wherein
for each of the first communication satellites, the first communication satellite turns off the beam and stops providing services in performing the beam bias conversion at the position near the Arctic region and at the position near the Antarctic region, and first communication satellites in two first orbits adjacent to a first orbit of the first communication satellite provide services with beams.

19. The system according to claim 17, wherein,
at the position near the Arctic region and at the position near the Antarctic region, first communication satellites in two adjacent first orbits respectively perform beam bias conversion when reaching or leaving a position in a double overlapping coverage region, to acquire a maximum conversion processing time interval between adjacent first communication satellites in different orbits.

20. The system according to claim 17, wherein for each of the first communication satellites,
the first communication satellite turns off the beam and stops providing services in performing the beam bias conversion at the position near the ascending node, and a satellite adjacent to the first communication satellite, on another side of the ascending node and in a same first orbit as the first communication satellite, provides a coverage service with beams; and
the first communication satellite turns off the beam and stops providing services in performing the beam bias conversion at the position near the descending node, and a satellite adjacent to the first communication satellite, on another side of the descending node and in a same first orbit as the first communication satellite, provides a coverage service with beams.

21. The system according to claim 17, wherein for each of the first communication satellites,
before the first communication satellite at the position near the ascending node or at the position near the descending node turns off beams, coverage by beams of the first communication satellite and coverage by beams of an adjacent first communication satellite at another side of the ascending node or the descending node form a double overlapping coverage on a service region of the earth, wherein the bias direction of the beams of the adjacent first communication satellite is opposite to the bias direction of the beams of the first communication satellite.

22. The system according to claim 17, wherein for each of the first communication satellites,
at the position near the ascending node or at the position near the descending node, at most one first communication satellite turns off beams and stops providing services at a time instant, and all adjacent first communication satellites turn on beams.

23. The system according to claim 17, wherein
regions covered by beams of adjacent first communication satellites in a same orbital plane are evenly overlapped in the constant beam bias conversion, to achieve a seamless beam coverage with a least beam coverage margin.

24. The system according to claim 17, wherein it is supported that all the first communication satellites turn off or turn on beams.

25. The system according to claim 17, wherein
for each of the first communication satellites, an angular velocity of beams of the first communication satellite relative to the earth is the same as an angular velocity of the first communication satellite relative to the earth.

26. The system according to claim 17, wherein for each of the first communication satellites,
the first communication satellite comprises an orbit control thruster, and a reaction wheel or a control moment gyroscope, the orbit control thruster is configured to generate a thrust for performing orbit control, and the reaction wheel or the control moment gyroscope are configured to provide a torque to control an attitude of a satellite.

27. The system according to claim 17, wherein each of the first communication satellites further comprises one or more radio antennas to transmit and receive beams.

28. The system according to claim 17, wherein each of the first communication satellites transmits a radio signal to a surface of the earth to form a beam.

29. The system according to claim 17, wherein
a beam is turned off and stops providing services in the beam bias conversion, and the beam is turned on and provides service after the beam bias conversion.

30. The system according to claim 17, wherein that the plurality of first communication satellites in each of the first orbits are distributed with a predetermined phase indicates the first communication satellites in each of the first orbits are distributed at equal intervals.

* * * * *